Patented Mar. 15, 1927.

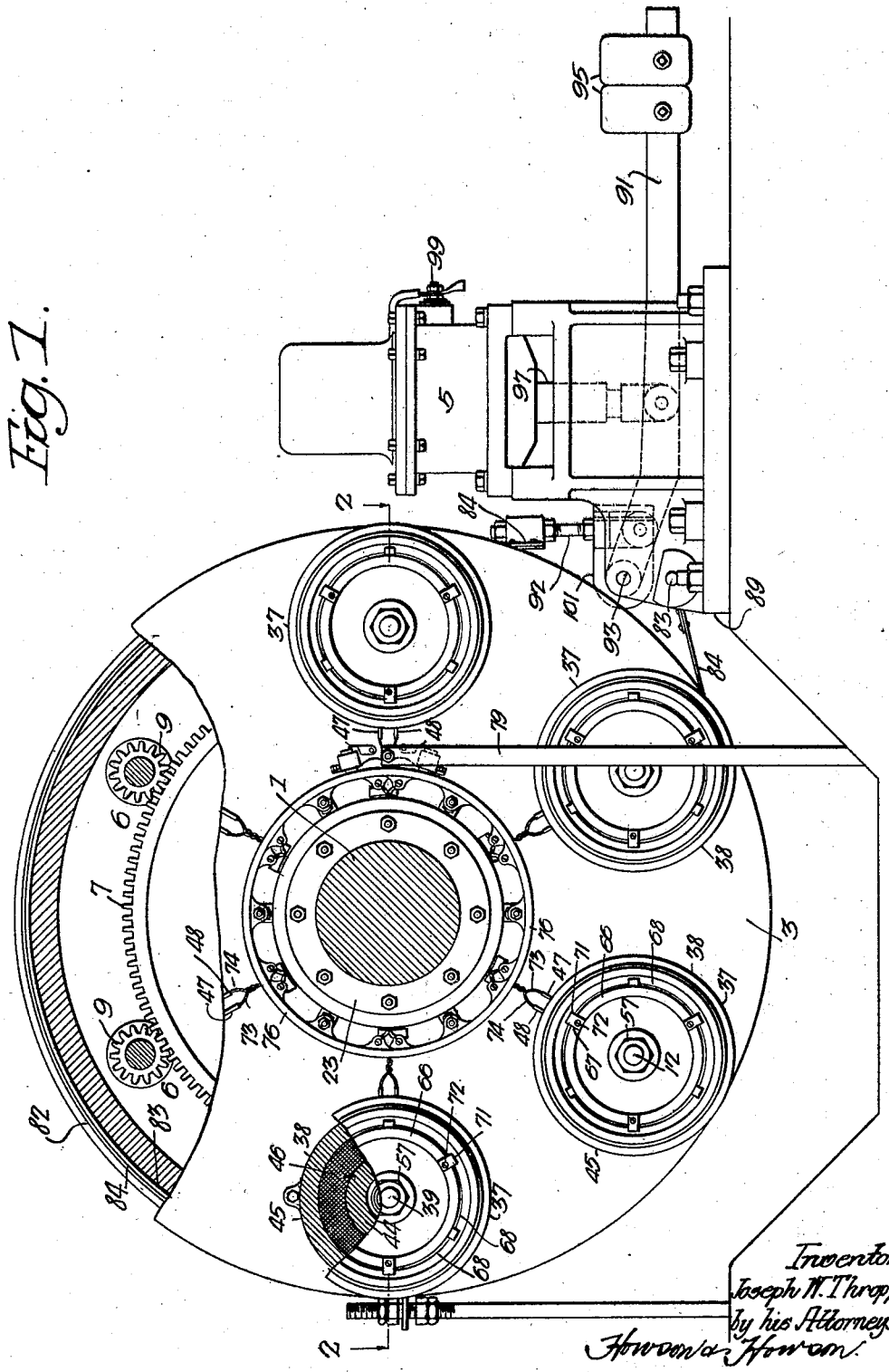

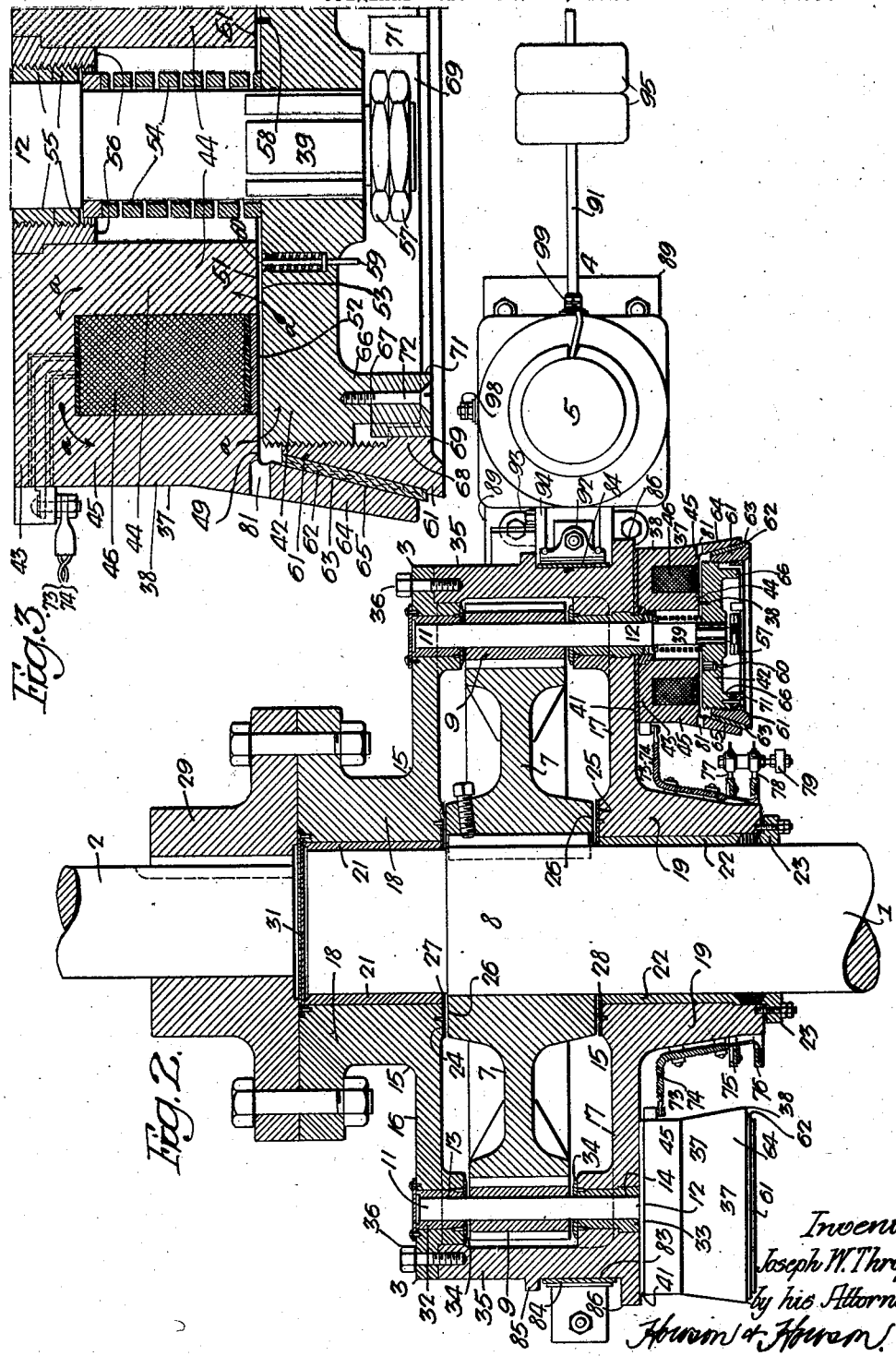

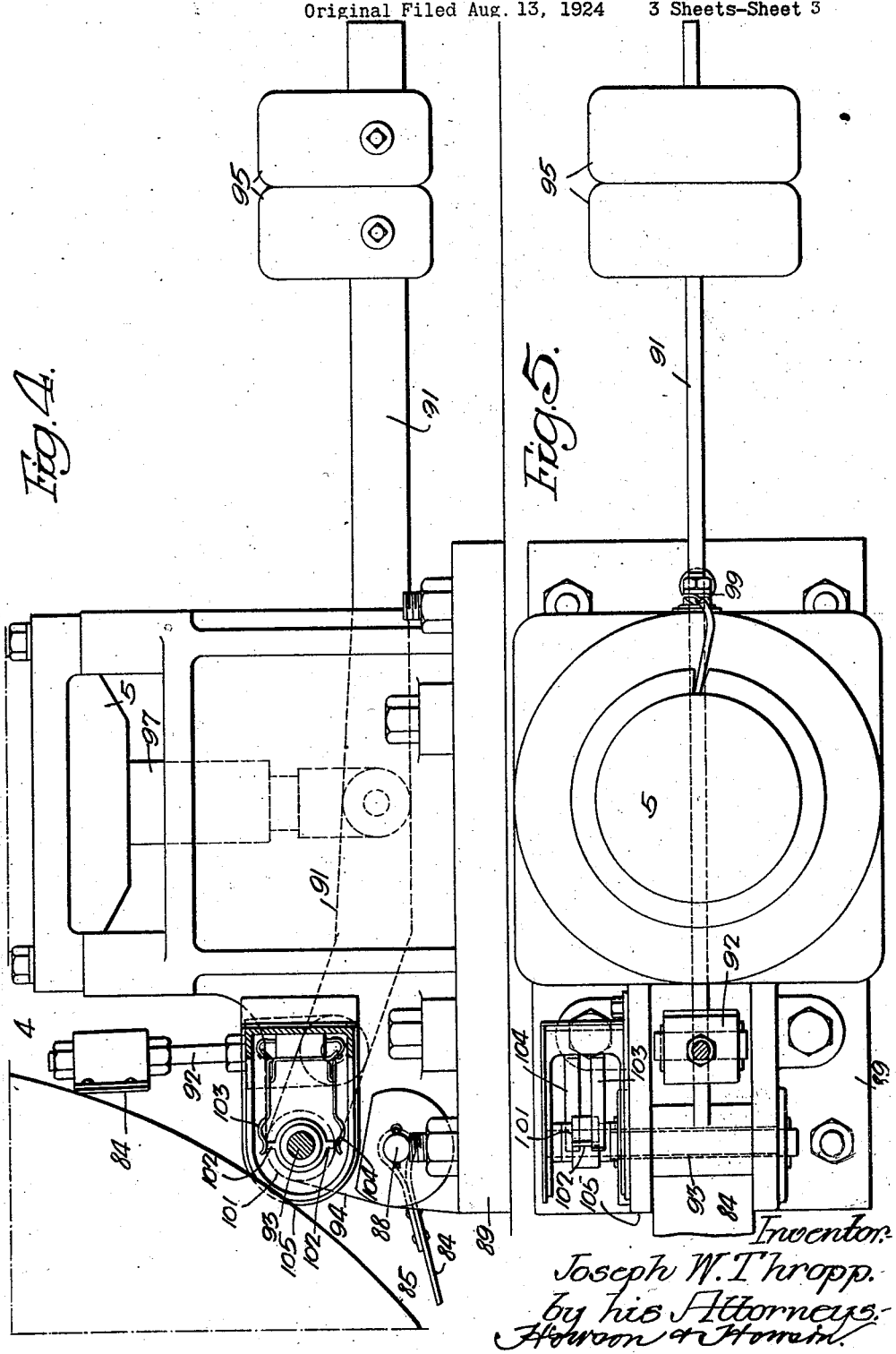

1,621,385

UNITED STATES PATENT OFFICE.

JOSEPH W. THROPP, OF TRENTON, NEW JERSEY.

POWER-TRANSMISSION SYSTEM.

Application filed August 13, 1924, Serial No. 731,890. Renewed December 11, 1926.

My invention relates to power transmission systems, and it has particular relation to means for magnetically connecting such systems. The system to which the invention relates is of the type disclosed in my Patent 1,380,271, dated May 31, 1921, for clutches.

One object of my invention is to provide a clutch structure for operatively associating power transmission systems, together with simple and efficient braking means therefor.

Another object of my invention is to provide magnetic clutch mechanism, wherein undesirable leakage is reduced to a minimum.

A further object of my invention is to provide a magnetic clutch, wherein the formation of air cushions between the relatively movable parts is substantially avoided.

Other objects and applications of my invention, as well as details of construction and operation, whereby my invention may be practiced, will be apparent from the following description and claims, when taken in connection with the accompanying drawing, wherein, Fig. 1 is a side elevational view of one form of embodiment of my invention;

Fig. 2 is a horizontal sectional view taken on the line II—II of Fig. 1;

Fig. 3 is an enlarged detail view of the magnetic clutch of the preceding figures; and, Figs. 4 and 5 are enlarged detail elevational and top plan views, respectively, of the control switch and brake arm.

In the illustrated form of embodiment of my invention shown in the drawing, a driving shaft 1 is operatively associated with a driven shaft 2 by means of a magnetically controlled coupling 3 adapted to constitute one part of a braking apparatus 4, the effectiveness of which may be controlled by a solenoid 5 or other actuating means.

The coupling 3 may embody a planetary gear system 6, a driving sun gear 7 of which is keyed to an end portion 8 of the driving shaft 1. A plurality of cooperating planet gears 9 are provided with trunnions 11 and 12 which are mounted respectively, in bearings 13 and 14 formed in a planet carrier 15. The planet carrier 15 forms an enclosing casing for the planetary gear system 6 and it comprises side wall portions 16 and 17 which respectively terminate in hub portions 18 and 19 loosely mounted on portions of the driving shaft 1 positioned on opposite sides of the driving gear 7.

The hub portions 18 and 19 are preferably provided with bronze bushings 21 and 22, the latter being adjustable as at 23, whereby the driving shaft 1 may be magnetically insulated from the planet carrier hub portions 18 and 19, as will appear more fully hereinafter. The side portions 24 and 25 of the hubs 18 and 19 are also magnetically insulated from the adjacent sides of a hub portion 26 of the driving gear 7 by means of bronze thrust plates 27 and 28, respectively. The hub portion 18 of the planet carrier 15 may be secured to the driving shaft 2 by means of a flanged coupling 29 of usual design. A bronze plate 31 which is carried by the hub 18, serves to insulate magnetically the end of the driving shaft 1 from the driven shaft 2.

The bearings 13 and 14 for the planet-gear trunnions 11 and 12 are also provided with bronze bushings 32 and 33, respectively, while the side portions of the planet gears 9 are magnetically insulated from the adjacent side walls 16 and 17 by means of bronze thrust plates 34. The outer end of the side wall 17 is provided with a cylindrical flange 35, the end of which is rigidly secured to the outer end of the side wall 16 by bolts 36, whereby the side walls 16 and 17 may be rigidly secured together to form the planet carrier 15.

The planet gears 9 may be locked or unlocked to effect an operative or inoperative connection between the driving shaft 1 and the driven shaft 2 by a plurality of magnetic clutches 37, which constitute the subject-matter of my co-pending application for magnetic clutches, Ser. No. 648,525, filed June 29, 1923. Each magnetic clutch 37 comprises a field member 38, which is mounted about a projecting portion 39 of the planet trunnion 12, and it may be secured to an outer side of the coupling wall 17, an intervening bronze plate 41 serving to magnetically insulate the same. A longitudinally movable armature member 42 is mounted on the end of the trunnion 12, whereby the planet gear 9 may be locked at will, all as will appear more fully hereinafter.

The field member 38 comprises an annular magnetizable base portion 43, which is secured to the wall 17, as above-noted, and it further comprises projecting annular flanges 44 and 45, forming spaced inner and outer cylinders, the projecting shaft portion 39 of the trunnion 12 extending through the inner cylinder 44. A magnetizing winding 46 having terminal connections 47 and 48 is positioned in the annular space between the cylinders 44 and 45. The outer end of the cylindrical flanges 44 and 45 are in alignment and form pole faces 49 and 51. The adjacent open side of the magnetizing coil 46 may be protected by means of a non-magnetizable cover member 52.

The armature member 42, which is provided with a surface 53 co-extensive with that of the pole faces 49—51, is slidably mounted on the end of the projecting shaft portion 39 for longitudinal movement only, the latter being in the form of a hexagon and the armature sliding surface in engagement therewith being correspondingly formed.

The adjacent armature and field-member surfaces 51 and 53, respectively, may be held in spaced relation by means of a spring 54 concentrically mounted about the projecting shaft portion 39. One end of the spring 54 engages the armature member 42, while the other end thereof engages one of a pair of adjusting nuts 55—55 which are in threaded engagement with a bronze bushing 56 for the inner cylindrical flange 44. The adjusting nuts 55—55 further engage an inner end of the bronze bushing 33. The end of the projecting shaft portion 39 beyond the armature member 42 is threaded to receive a pair of adjusting nuts 57—57 which are designed to prevent the spring 54 from forcing the armature member 42 off the shaft extension 39 as well as to determine the force of the spring 54.

The armature 42 may be prevented from contacting with the pole faces 51 so as to avoid the magnetization of the armature 42 by providing the latter with a plurality of spaced pins 58 of brass or other non-magnetizable material. The extent of the air gap between the pole faces 51 and the armature surface 53 may be ascertained at all times by means of a co-called "air-gap tester" 59 which comprises a resiliently mounted gauge pin 60 accessible from an outer surface of the armature 42, all as set forth in my co-pending application above-noted.

A cylindrical member 61 is secured in threaded engagement with the armature member 42, the outer surface thereof being conical in form and provided with a friction lining 62 forming a clutch surface 63. The member 61 is preferably of bronze in order that undesirable magnetic leakage between the field piece 38 and the armature 42 may be further avoided. The outer cylindrical flange 45 may be extended to form a projecting portion 64 having an inner conical surface 65 so conforming to that of the cylindrical member 61 as to constitute a cooperating clutch surface.

The above-noted threaded engagement of the armature member 42 and the cylindrical member 61 provides for such adjustment of the clutch surfaces 63 and 65 as may be desired. The cylindrical member 61 may be locked to the armature member 42 in certain predetermined positions by providing the latter with an outwardly extending flange 66 having transversely extending slots 67, and by providing the cylindrical member 61 with an inwardly extending flange 68 having complementary slots 69 for key members 71. The key members 71 may be removably secured in position by means of screws 72 extending through the same and into threaded borings in the armature member 42.

The terminals 47 and 48 of the several magnetic clutches are respectively connected by conductors 73 and 74 to slip rings 75 and 76 which are insulatingly mounted on an outer end of the hub 19. A pair of brushes 77 and 78, which are connected to an energy source (not shown), are mounted on an adjustably positioned brush holder 79.

In the operation of the power transmission system shown in the several figures of the drawing, when the magnetizing windings 46 of the several magnetic clutches 37 are de-energized, the frictional contacting surfaces 63 and 65 are held out of engagement by the force of the spring 54, so that the planet gears 9 turning idly as the driving shaft 1 and sun gear 7 revolve. Hence, there is no transfer of power from the driving shaft 1 to the driven shaft 2.

However, when currents are supplied to the magnetizing windings 46, the force of attraction between the field piece 38 and the armature member 42 overcomes that of the releasing spring 54, causing the engagement of the cooperating frictional clutch surfaces 63 and 65 and the consequent locking of the planet gears 9. With the locking of the planet gears 9, the operation of the driving shaft 1 causes a corresponding movement of the planet carrier 15 and hence the shaft 2, thereby causing a transfer of power from the driving shaft 1 to the driven shaft 2.

In the practical application of my invention, considerable difficulty has been experienced due to the trapping of air between the relatively movable armature and field member surfaces 51 and 53, the trapped air preventing the complete engagement of the clutch surfaces 63 and 65 and thereby resulting in poor clutch operation. To avoid such undesirable effects, I provide one of the clutch members, say the outer flange 45 of the field piece 38, with a perforation 81 which extends from a point immediately adjacent to the pole faces 51 to the outer side thereof.

As hereinabove noted, an additional novel feature of my invention is the substantial elimination of the undesirable magnetic leakage between the field piece 38 and the armature 42, experience having shown that without such magnetic insulating means, the efficiency of my apparatus is impaired. Accordingly, the armature 42, the planet gears 9 and their trunnions 11 and 12, the sun gear 7 and the driving shaft 1 have been magnetically insulated from the remaining cooperating apparatus, by means of the several bronze elements above-mentioned so that the magnetic flux may normally tend to traverse a path shown by arrows $a$ in Fig. 3 of the drawing to the practical exclusion of the armature shaft 39. While I have described the several magnetic insulating elements as of bronze, it is to be understood that my invention is not to be expressly limited thereto inasmuch as other non-magnetic elements are also applicable to my invention.

My invention further contemplates braking means 82, which is directly operable on the driven shaft, experience having shown that by so doing the strain incident to the stopping of the apparatus is greatly reduced. One form of such apparatus is shown in the drawing, wherein the outer surface of the cylindrical flange 35 of the planet carrier 15 is formed to constitute a brake disk portion 83 for the braking apparatus 82. A cooperating brake band 84 may be retained in a desired position by means of flanges 85 and 86 which extend outwardly from the cylindrical flange 35 and which are positioned on opposite sides of the brake band 84. One end of the brake band 84 is rigidly secured to a supporting pin 88 mounted on a base member 89. The remaining end of the brake band 84 is secured to a brake-actuating lever 91 through an adjustable block-and-bolt mechanism 92 of known design. The brake lever 91 is secured at one end to a pin 93 pivotally mounted on a supporting structure 94 carried by the base member 89. The other end of the brake arm 91 is provided with a weight 95 which is adjustable to vary the braking force applied to the brake band 84. The brake arm 91 may be moved to release the braking action thereof to a desired extent by means of the solenoid 5 which is provided with a movable core 97 having one end secured to the brake arm 91. Terminal conductors 98 and 99 of the solenoid 5 may be connected with the usual energizing means (not shown).

Assuming the solenoid 5 energized, so that the brake arm 91 is raised and the brake band 84 is loose on the brake disk 83, the planet carrier 15, as well as the driven shaft 2, are free to revolve in accordance with the operation of the driving shaft 1. However, when the solenoid 5 is de-energized, the weighted brake arm 91 falls, causing the brake band 84 to engage the brake disk 83 with a force depending upon the position of the weight 95 on the brake arm 91. The engagement of the brake band 84 and the brake disk 83 may thus cause the stopping of the driven shaft 2.

For operating and controlling the system as a whole, I prefer to use a control system such as set forth in my copending application, Serial No. 731,889, filed August 13, 1924. Inasmuch as this control system is fully disclosed in the said application, a detailed description of it in this application can be omitted. However, the control system comprises a contact switch which is mechanically operated by parts of the present mechanism, and this switch is shown in the drawings and will be described. The switch is shown at 101 in Figs. 4 and 5 and it is constructed to be operated by the movement of the brake arm 91 by providing a pair of movable contact elements 102 on the movable brake pin 93. A pair of co-acting stationary contact elements 103 and 104 are suitably mounted in a supporting casing 105 so that an electrical circuit is completed through the contact elements 102, 103 and 104 when the arm 91 is in the brake releasing position only.

While I have shown and described a specific embodiment of my invention, for the purpose of illustrating the principles of construction and operation thereof, it is apparent that various changes and modifications may be made therein without departing from the spirit of my invention, I desire, therefore, that only such limitations shall be imposed thereon, as are indicated in the appended claims or as are demanded by the prior art.

I claim:

1. In a clutch, the combination of a rotatable member, a gear secured to the rotatable member, a second member rotatable concentrically with the first member, a pinion movable with the second member and meshing with the said gear, a shaft rotatably mounted on the second member and carrying the pinion, a friction element having a splined connection with the shaft near the outer end thereof, a second friction element fixedly secured to the said second rotatable member, a spring tending to move the first said friction element outward along the shaft away from the second friction element, means carried by the shaft for limiting the last said movement, and electro-magnetic means for moving the first said friction element in opposition to the spring inward along the shaft into engagement with the second friction element.

2. In a clutch, the combination of a rotatable member, a gear secured to the rotatable member, a second member rotatable concentrically with the first member, a pinion movable with the second member and meshing with the said gear, a shaft rotatably mounted on the second member and carrying the pinion, a friction element having a splined connection with the shaft near the outer end thereof, a second friction element fixedly secured to the said second rotatable member, a spring surrounding the shaft and tending to move the first said friction element outward along the shaft away from the second friction element, means carried by the shaft at the outer end thereof for limiting the last said movement, and electro-magnetic means surrounding the shaft and the spring for moving the first said friction element in opposition to the spring inward along the shaft into engagement with the second friction element.

3. In a clutch, the combination of a rotatable member, a gear secured to the rotatable member, a second member rotatable concentrically with the first member, a pinion movable with the second member and meshing with the said gear, a shaft rotatably mounted on the second member and carrying the pinion, an armature member splined on the shaft near the outer end thereof, a friction element carried by the armature member, a second friction element fixedly secured to the said second rotatable member, a spring tending to move the said armature member together with its friction element outward along the shaft away from the second friction element, means carried by the shaft for limiting the last said movement, an electromagnet for moving the armature member in opposition to the spring inward along the shaft to bring the first friction element into engagement with the second friction element, and means for adjusting the first said friction element axially with respect to the armature member so as to change the frictional engagement without changing the relation between the armature member and the magnet.

4. In combination, a magnetic clutch comprising a field piece, supporting means for said field piece, and a cooperating armature member, said supporting means constituting one element of a brake.

5. In combination, a power source, driven means, clutch apparatus having cooperating parts respectively associated with said power source and said driven means, and brake apparatus, one element of said clutch apparatus constituting an element of said brake apparatus, the latter including a cooperating element, and means for controlling the operation of said brake apparatus.

6. In combination, a power source, driven means, a planetary gear set, the elements of which are operatively associated with said power source and driven means, clutch means for determining the operation and inoperation of the planet gears, and braking means for said driven means.

7. In combination, a power source, driven means, a sun gear secured to said power source, a planet carrier secured to said driven means, a planet gear revolubly carried by said carrier and positioned to mesh with said sun gear, and braking apparatus of which said planet carrier constitutes one element.

8. In combination, a power source, driven means, a sun gear secured to said power source, a planet carrier secured to said driven means, a planet gear revolubly carried by said carrier and positioned to mesh with said sun gear, means for locking said planet gear, and braking apparatus of which said planet carrier constitutes one element.

9. A power transmission system comprising operating elements, sun gear secured to one of said elements, a planet carrier secured to another of said elements, a planet gear revolubly carried by said carrier and positioned to mesh with said sun gear, releasable brake apparatus, said planet carrier constituting the disk of said brake apparatus, the latter also including a cooperating brake band, and means for releasing said brake apparatus.

10. In a system of power transmission apparatus, the combination with a power source and driven means, of a sun gear secured to said power source, a planet carrier secured to said driven means, a planet gear revolubly carried by said carrier and positioned to mesh with said sun gear, gravity-set brake apparatus, said planet carrier constituting one element of said brake apparatus, the latter also including a cooperating brake band, weighted means for exerting a force on said band, and means for determining the effectiveness of said last-mentioned means.

11. In combination, operating elements, a sun gear secured to one of said elements, a planet carrier secured to another of said elements, a planet gear revolubly carried by said carrier and positioned to mesh with said sun gear, a brake band operably associated with said planet carrier, a brake lever secured to said brake band, and magnetic means for determining the effectiveness of said brake lever.

12. In combination, a power source, driven means, a sun gear secured to said power source, a planet carrier secured to said driven means, a planet gear revolubly carried by said carrier and positioned to mesh with said sun gear, magnetic clutch means respectively secured to said planet carrier and said planet gear, and means for minimizing magnetic leakage.

13. A power system comprising, a power source, driven means, a sun gear secured to said power source, a planet carrier secured to said driven means, a planet gear revolubly carried by said carrier and positioned to mesh with said sun gear, a field piece secured to said planet carrier, a cooperating armature member secured to said sun gear, and means for so magnetically insulating said field piece from said armature as to minimize leakage.

14. In combination, a power source, driven means, a driving sun gear secured to said power source, a driven planet carrier secured to said driven means, a planet gear revolubly carried by said carrier and positioned to mesh with said sun gear, and a magnetic clutch comprising a field piece secured to said planet carrier, and a cooperating armature secured to said planet gear, said field piece and said armature member having telescoping portions, one of said portions being so perforated as to avoid the trapping of air therebetween.

15. A magnetic clutch comprising a field piece, an armature member mounted for movement relative to said field piece, said field piece and said armature member having cooperating friction surfaces, said field piece being provided with a perforation extending into the space intermediate said field piece and said armature, whereby the air pressure intermediate the same may be maintained substantially uniform.

16. A clutch having cooperating parts, supporting means for one of said parts, a brake, said supporting means constituting an element of said brake, and a switch actuated by the other element of said brake.

17. In combination, a clutch comprising cooperating parts, supporting means for one of said parts constituting a brake drum, a brake band for said drum, a brake lever for actuating said brake drum, and circuit-interrupting means operated by said brake lever.

JOSEPH W. THROPP.